March 15, 1966 C. J. AMATO 3,241,038
PORTABLE STATIC INVERTER WITH REDUCED HARMONIC
CONTENT IN THE OUTPUT WAVE FORM
Filed Feb. 2, 1960 4 Sheets-Sheet 4
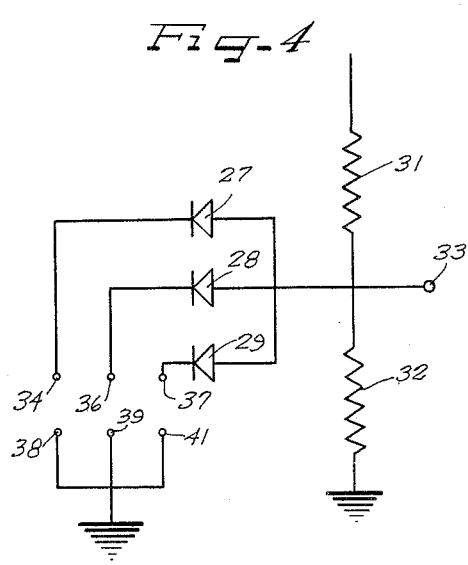
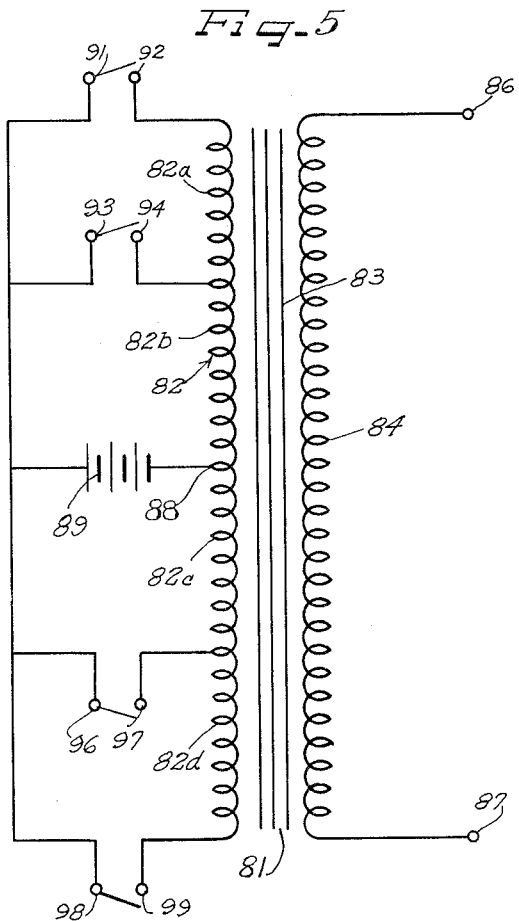
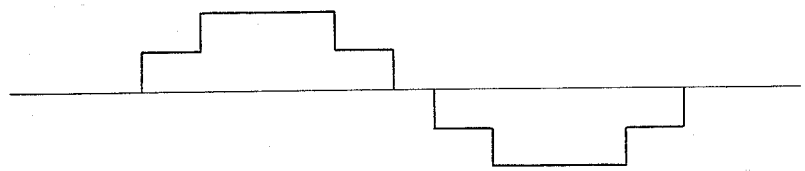
INVENTOR
Carmelo J. Amato
BY
ATTORNEY

United States Patent Office 3,241,038
Patented Mar. 15, 1966

3,241,038
PORTABLE STATIC INVERTER WITH REDUCED HARMONIC CONTENT IN THE OUTPUT WAVE FORM
Carmelo J. Amato, Shaker Heights, Ohio, assignor to Thompson Ramo Wooldridge Inc., Cleveland, Ohio, a corporation of Ohio
Filed Feb. 2, 1960, Ser. No. 6,171
5 Claims. (Cl. 321—44)

The present invention is directed to an improved static inverter for changing a direct current source to an alternating voltage at a predetermined frequency. The invention described herein has particular applicability for electrical systems in aircraft which require an alternating current source of 400 cycles for operation of electrical equipment. For aircraft purposes, it is important that an inverter be light weight, of small size, and provide a high degree of electrical efficiency.

The circuit of the present invention is particularly designed for transistors operating in a switching mode. When the transistor is off, the voltage across the transistor is high, but the current is low, and hence the transistor dissipation is low. With the transistor on, the current is high but the voltage is low and again the dissipation is low. From a theoretical standpoint, it is possible to achieve efficiencies above 95% on the transistor portions of the circuit. Even when the transformer and regulator losses are included, the overall efficiency is still about 85%.

The savings in weight and size resulting from the decreased transistor dissipation and increased efficiency are appreciable. However, a static square wave type inverter employing transistors has the disadvantage of high harmonic content. The percentage distortion is inversely proportional to the harmonic number; that is, the percentage of the third harmonic is about 33%, the fifth harmonic distortion is about 20%, the seventh harmonic distortion is about 14% and so on. The total harmonic distortion for a square wave is 48.3%. Even with this high degree of distortion, it is possible to filter the square wave to obtain less than 5% distortion for fixed loads. However, in order to maintain low distortion over large load variations, a complex, heavy, power consuming filter must be employed. The necessity for the provision of such a filter is a distinct drawback as, to a large extent, it tends to cancel some of the advantages provided in the first instance by the square wave type inverter.

One of the objects of the present invention is to provide an improved static inverter in which the harmonic content of the output wave form is considerably reduced, so that very little filtering is required to maintain a harmonic distortion within reasonable limits.

Another object of the present invention is to provide a static inverter circuit which has a stable output frequency over wide temperature variations.

Other objects and features of the present invention will become apparent to those skilled in the art from the following description, taken in conjunction with the attached sheets of drawings which illustrate a preferred embodiment of the invention.

The circuits of the present invention employ wave generating means which cooperate to generate a composite wave form having half-wave symmetry. Expressed mathematically, the composite wave forms have the relationship:

$$f(\omega t + \pi) = -f(\omega t)$$

In this type of wave form, there are only odd harmonics, and with a proper choice of time origin, the equation for such a wave form can be written as an infinite series of sine functions.

If two such wave forms are shifted in phase with respect to each other and added together, it is possible to cancel certain harmonics. By shifting the two wave forms by $180°/N$ on the fundamental time scale, they are shifted $180°$ on the Nth harmonic time scale, thereby cancelling the Nth harmonic and its multiples. To take a specific example, if two waves having half wave symmetry are shifted $60°$ with respect to each other and added, the third harmonic and all multiples of the third harmonic are eliminated. The resultant wave form has only fifth, seventh, eleventh, thirteenth, seventeenth harmonics and so on. Then, if the two new wave forms are shifted by $36°$ and added, the fifth harmonic and its multiples are eliminated. The circuit shown in the drawings is an example of this type of circuit, i.e., one that eliminates the third harmonic, the fifth harmonic, and their multiples, but it should be appreciated that the invention is equally applicable to other circuits to eliminate harmonics higher than the third and fifth.

In the drawings:

FIGURE 4 is the diagram of a gating circuit which may be employed in the circuit of FIGURE 1;

FIGURE 5 is a somewhat schematic circuit diagram of an output transformer which may be employed for the circuit of FIGURE 1; and FIGURE 6 illustrates the wave form of the simulated sinusoidal output voltage produced in each of the phases of the three-phase system of FIGURE 1.

Figure 1:
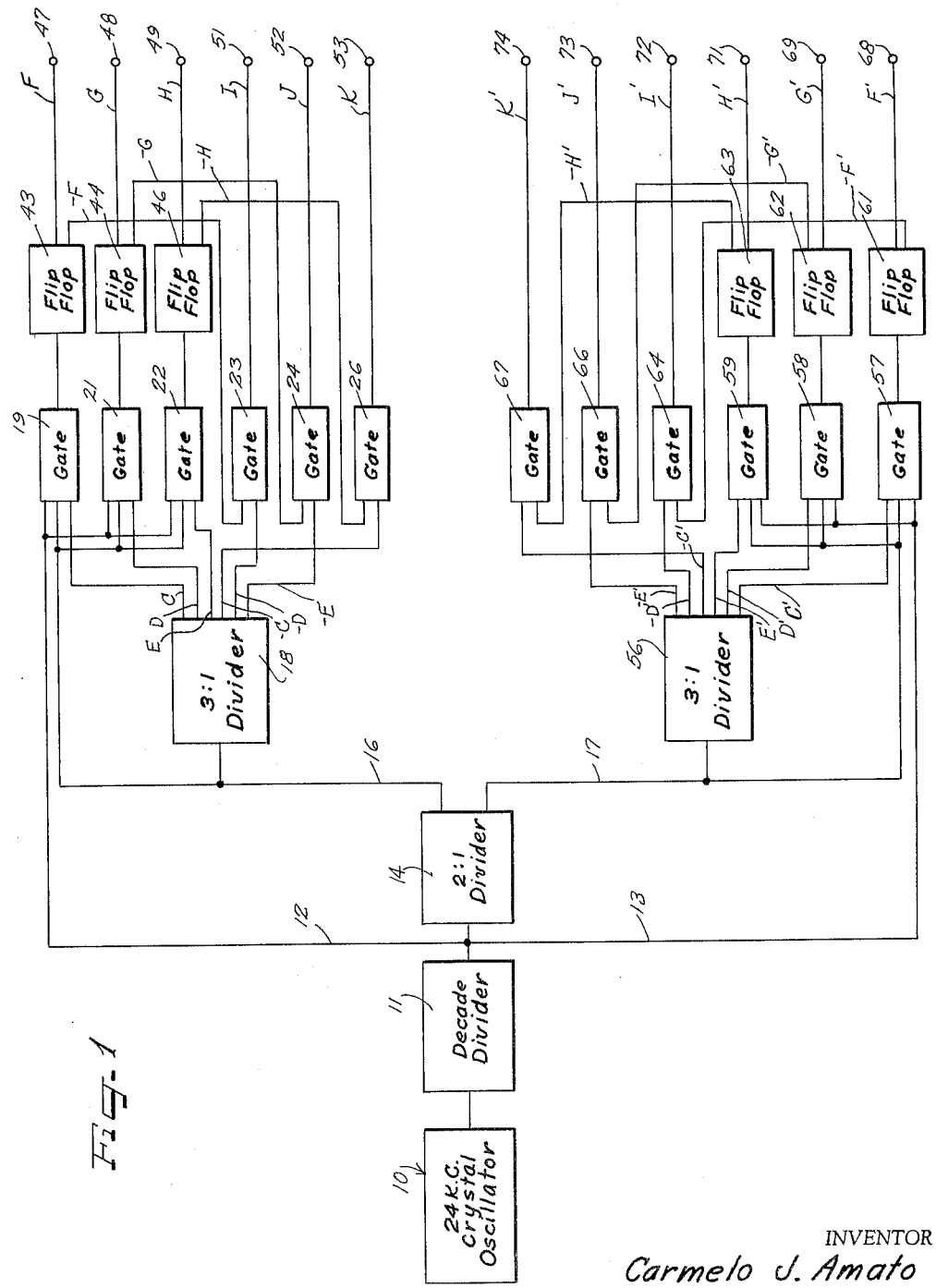
FIGURE 1 is a circuit diagram, in block diagram form, illustrating the system of the present invention as it is applied to the generation of a three-phase, 400 cycle alternating voltage.

In FIGURE 1, reference numeral 10 indicates generally a synchronizing device such as a crystal controlled oscillator 10 operating at a frequency of 24 kilocycles. The output of the oscillator 10 is directed to a frequency dividing means which, in the illustrated instance, consists of a decade divider 11. Basically, this type of circuit is a heavily biased relaxation circuit employing a forced recycling circuit using four stages. Decade dividers of this type are well-known in the art, and a further description and diagram of such a divider may be found on page 304 of the book entitled, "Electronic Engineering" by Samuel Seely (McGraw-Hill Book Company, 1956).

The decade divider 11 has an output consisting of an unsymmetrical voltage wave having a frequency of $\frac{1}{10}$ of the frequency of the oscillator 10. This voltage wave form is illustrated as wave form A in FIGURES 2 and 3. As indicated, the pulses constituting the wave form are on for $\frac{3}{5}$ of the period and off for $\frac{2}{5}$.

The output of the decade divider 11 is split into two portions through lines 12 and 13 and is used to energize portions of the circuit to be described in a succeeding portion of this description. A third portion of the output of the decade divider 11 passes to a second frequency divider 14 which converts the unsymmetrical output of the decade divider 11 into a series of symmetrical pulses, at a frequency of $\frac{1}{2}$ the frequency of the output from the decade divider 11. The divider 14 may be of the well-known Eccles-Jordon trigger type, and this type of circuit is described on page 298 of the aforementioned "Electronic Engineering" by Seely. The divider 14 is triggered only by the positive pulses arriving from the decade divider 11 and consequently, the resulting output wave form, illustrated as wave form B in FIGURE 2 is a series of symmetrical rectangular pulses having a period of twice the period of wave form "A." In the specific embodiment shown in the drawings, since the output frequency of the decade divider 11 is 2400 cycles, the frequency of the wave form would be 1200 cycles.

The output of the divider 14 consists of two rectangular wave trains, 180° out of phase with each other. One of the phases, that corresponding to wave form B of FIGURE 2 is passed through a conductor 16, to one side of the circuit, and the other represented by wave form B' in FIGURE 3, is conducted by conductor 17 to the opposite side of the circuit.

Figure 2:
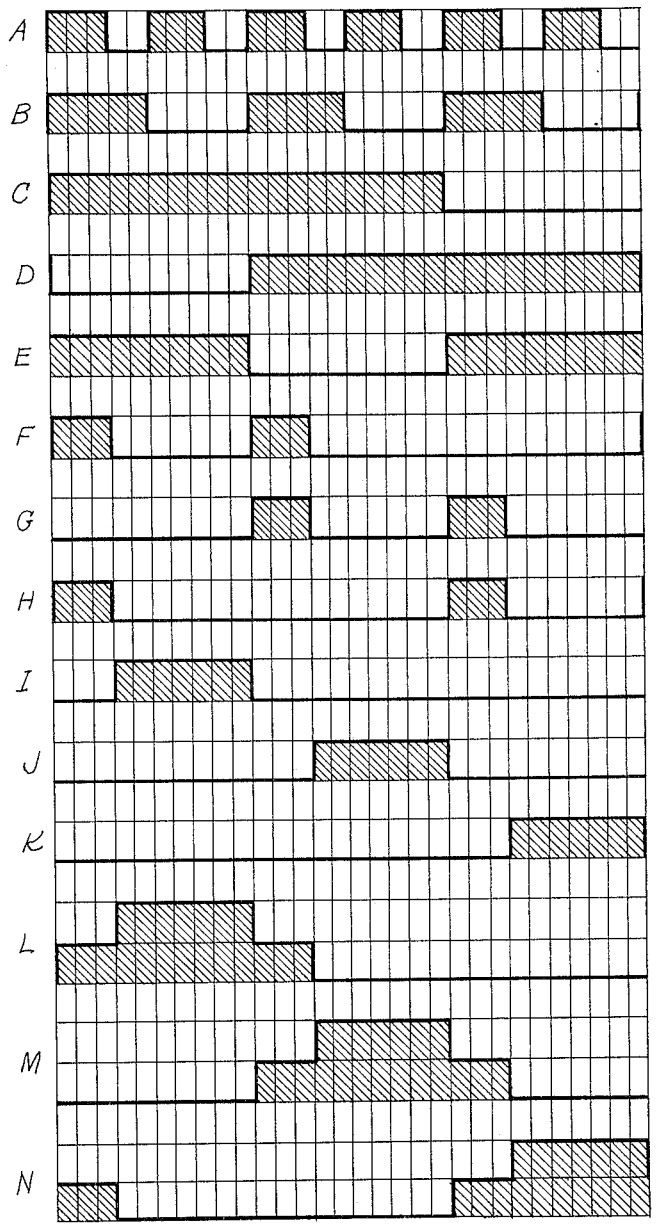
FIGURE 2 is a set of wave forms illustrating the wave forms occurring at one portion of the circuit illustrated in FIGURE 1.
Figure 3:
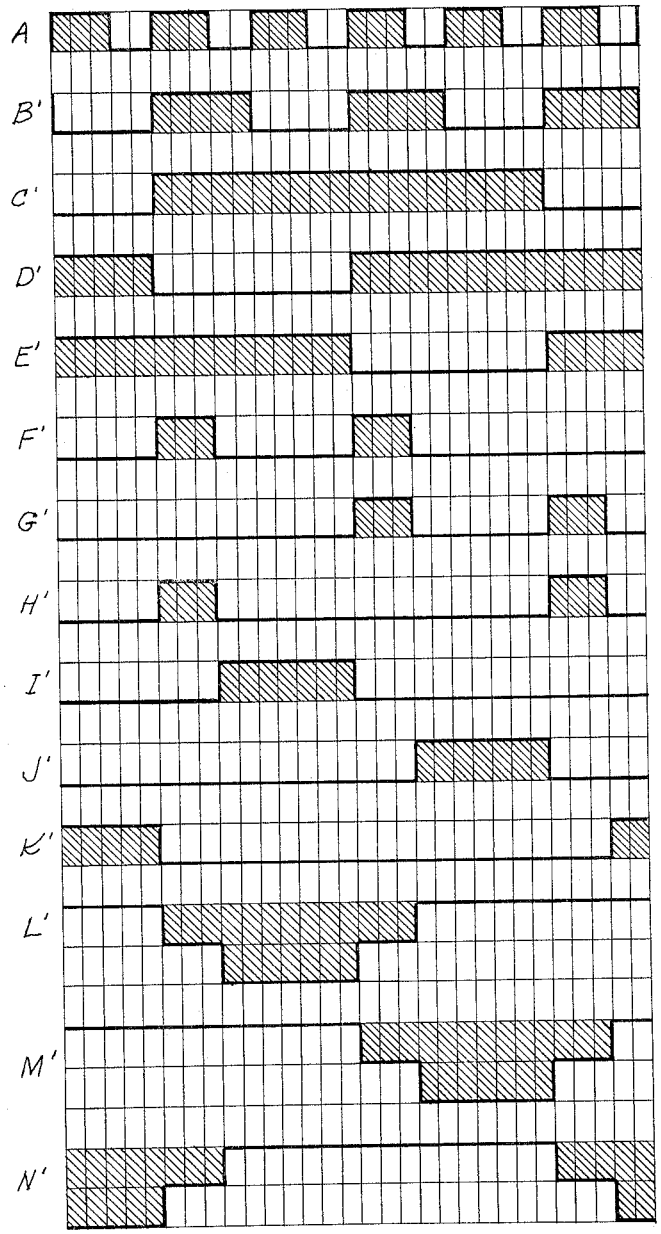
FIGURE 3 is a series of wave forms illustrating the wave forms for another portion of the circuit of FIGURE 3.

The wave train represented by wave form B of FIGURE 2 is divided into two portions, one passing into a 3:1 divider 18, and the other portion being applied to a series of gating circuits 19, 21, and 22 which will be hereinafter described. The divider 18 consists of a "scale of three" circuit which may take the form of a pentode circuit arrangement employing the circuitry of the type shown on page 306 of "Electronic Engineering" by Seely, supra. Thus, for every third pulse of wave form B, there is a single pulse produced at the output of the divider 18. The wave form of this pulse has been illustrated as wave form C of FIGURE 2.

The three outputs from the divider 18 which energize the gating circuits 19, 21 and 22 are identified as wave forms "C," "D," and "E" in FIGURE 2. As illustrated, the wave forms are identical, except that each is 120° out of phase with the others.

The inverse outputs of C, D, and E are also produced; that is, the positive portion of the wave form becomes zero while the zero portion becomes positive. These are designated as —C, —D, and —E.

The outputs from the divider 18 are passed to a series of gating circuits 19, 21, 22, 23, 24 and 26. Each of these circuits may be identical to the extent that in order for the gating circuit to be operative, the inputs to the circuit must all be above zero voltage. As illustrated in FIGURE 1, the gating circuits 19, 21 and 22 are each energized with three voltages, one being the voltage from the divider 11 and having wave form A of FIGURE 2, the second being the output of the divider 14 and having the waveform B of FIGURE 2, and the third being the output from the divider 18 and having wave form C of FIGURE 2.

A typical gating circuit has been illustrated in FIGURE 4 of the drawings. As illustrated, the circuit consists of a plurality of rectifiers 27, 28 and 29 in parallel, the rectifiers usually consisting of semi-conductor diodes, although vacuum tube diodes may obviously also be employed. A direct current voltage is applied across a resistor network consisting of resistors 31 and 32, and the output of the gating circuit is derived across the resistor 32 at a terminal 33. The three rectifiers, 27, 28 and 29 are connected to terminals 34, 36 and 37 respectively and opposed terminals 38, 39 and 41 are connected to ground. The input voltage from the divider 11 is impressed between terminals 34 and 38, the voltage from the divider 14 is impressed between terminals 36 and 39, and the voltage from the divider 18 is impressed between terminals 37 and 41. From the circuit of FIGURE 4, it will be seen that if any of the three voltages appearing across the opposed terminals is at zero potential, the respective rectifier will conduct current, and thereby short out the resistor 32, so that no voltage will appear at terminal 33.

The output from the gating circuits 19, 21 and 22 are sent to a plurality of "flip-flop" circuits 43, 44 and 46 respectively. This type of circuit accepts both positive and negative pulses and produces a series of pulses represented at wave forms F, G, and H in FIGURE 2. As indicated, the wave trains are identical except for a difference of 120° in phase. The "flip-flop" circuits also produce the inverse of wave forms F, G, and H; that is, the positive portion of the wave becomes zero while the zero portion becomes positive. These are designated as —F, —G and —H. A typical "flip-flop" circuit may be found described on page 300, in Figure 9–39 of "Electronic Engineering" by Seely.

As illustrated in FIGURE 1, the output of the "flip-flop" circuits 43, 44 and 46 are divided into two parts, one portion appearing at terminals 47, 48 and 49, and the inverse portion being directed to the gating circuits, 23, 24 and 26 respectively. In the last-named three circuits, the output of the "flip-flop" circuits is combined with the inverse output of the divider 18, and the gating circuits 23, 24 and 26 produce positive pulses only when both of the input voltages are above zero. The outputs of the gating circuit 23, 24 and 26 have been identified as wave forms I, J and K in FIGURE 2. These voltages appear at terminals 51, 52 and 53 of the circuit illustrated.

The remainder of the circuits of FIGURE 1 is essentially a duplication of the circuits previously described. The second output from the divider 14 is directed both to a 3:1 divider 56 and to gating circuits 57, 58 and 59. In those circuits, the output from the divider 14, having the voltage wave form illustrated in wave form B' of FIGURE 3 is combined with an output from the divider 56 having the wave form illustrated at C', D' and E' of FIGURE 3. The outputs of the gating circuit 57, 58, 59 are passed to a series of "flip-flop" circuits 61, 62 and 63 respectively and the outputs of these circuits, in turn, are sent to the remaining gating circuits 64, 66 and 67. The outputs of the "flip-flop" circuits 61, 62 and 63 have the wave forms identified as F', G' and H' in FIGURE 3, and appear at terminals 68, 69 and 71. The outputs of the three remaining gating circuits 64, 66 and 67 have the wave forms illustrated as I', J' and K' in FIGURE 3 and appear at terminals 72, 73 and 74.

The various wave forms are employed to control switches, to a transformer. The switch is on when the controlling wave form is positive and is off when the controlling wave form is zero. For this purpose, a transformer 81 of the type illustrated in FIGURE 5 of the drawings may be employed. The transformer 81 includes a tapped primary winding 82, consisting of sections 82a, 82b, 82c, and 82d, a core 83 and a secondary winding 84 across which are the output terminals 86 and 87. The primary winding 82 is center tapped as indicated at numeral 88 and a direct current source such as battery 89 is connected at the center tap. Taking a single phase only, the outputs appearing at terminals 47, 51, 73 and 69 control the transformer switches to form a simulated sinusoidal wave illustrated in FIGURE 6 of the drawings. The voltage wave represented by wave form F in FIGURE 2 closes the switch which connects terminals 91 to 92, and that represented by wave form I closes the switch which connects terminals 93 to 94. Similarly, the wave form represented at J' in FIGURE 3 closes the switch which connects terminals 96 to 97 and the wave form represented at G' closes the switch between terminals 98 and 99. When the voltage of wave form F is positive, the battery 89 will cause current to flow through the primary winding sections 82a and 82b and a voltage will appear at the secondary across terminals 86 and 87. When the voltage wave form I becomes positive, the switch which it controls will short circuit the terminals 93 and 94 and cause current flow only in section 82b of the primary winding. Accordingly, since the turns ratio of the secondary 84 to the effective number of turns in the primary 82 is now higher, the voltage output will increase at the terminals 86 and 87. Then, when the voltage of wave form I drops to zero and the second pulse appears from voltage wave form F, the voltage output at the terminals 86 and 87 will be correspondingly reduced. The net result is the production of a voltage having waveform L of FIGURE 2.

Similarly, in the next half cycle, the voltages represented at J' and G' will cause corresponding current flows in the primary sections 82c and 82d, but in the opposite direction in the primary winding, to produce the composite wave illustrated in FIGURE 6 of the drawings.

The other phases of the three-phase system are built up the same way. It will be seen from FIGURES 2 and 3 that the voltages having the wave forms L, M, N, L', M', and N' can be added together in proper phase relationship, to produce a three-phase voltage with the wave form of FIGURE 6.

The wave form of FIGURE 6 is a reasonably close approximation of a sine wave. This wave form can be expressed as a Fourier cosine series of the form:

$$e(t) = \sum_{n=0}^{\infty} \frac{A}{\pi n} \{ (\sin [n \, 42°] + \sin [n \, 78°]) (1 + [-1]^{(n-1)}) \} \cos \omega_n t$$

where $e(t)$ is the instantaneous voltage at time $t$, $A$ is a constant, $n$ is the harmonic number, and $\omega$ is the angular frequency.

From this equation, it can be shown that the only harmonics existing up to the fortieth harmonic are numbers 7, 11, 13, 17, 19, 23, 29, 31, and 37. The percentage harmonic distortion is 8.82, 9.09, 4.75, 3.63, 5.26, 2.68, 3.45, 3.23, and 1.67, respectively. The total percentage harmonic distortion is about 16% for this wave form. This lower degree of distortion, coupled with the fact that the first harmonic appearing is the seventh harmonic rather than the third, results in the ability to use a simple, lightweight filter for reducing the harmonic distortion to an acceptable level.

The circuits described generate a stable output frequency, since the output is not affected by temperature and transistor gain variations.

It will be evident that various modifications can be made to the described embodiment without departing from the scope of the present invention.

I claim as my invention:

1. A static inverter comprising a synchronizing device operating at a predetermined frequency, a first frequency dividing means triggered by said synchronizing device and arranged to generate an unsymmetrical voltage wave having a frequency which is a predetermined fraction of said predetermined frequency, a second frequency dividing means actuated by the output of said first frequency dividing means and arranged to generate a symmetrical voltage wave comprising positive and negative pulses and having a frequency which is a predetermined fraction of the frequency of the output of said first frequency dividing means, first circuit means actuated by said second frequency dividing means and arranged to generate pulses in phased relation from the positive pulses of said second frequency dividing means, second circuit means actuated by said second frequency dividing means and arranged to generate pulses in phased relation from the negative pulses of said second frequency dividing means, the amount of phase shifting provided by said first and second circuit means being sufficient to cancel out a lower harmonic when the outputs of said first and second circuits means are added together, and means connected to said first and second circuit means and sequentially energized by said first and second circuit means to produce a simulated sinusoidal voltage.

2. The inverter of claim 1 in which said unsymmetrical voltage wave is a series of substantially rectangular pulses.

3. The inverter of claim 1 in which said simulated sinusoidal voltage is substantially devoid of lower harmonics of the fundamental frequency of said voltage.

4. The inverter of claim 1 in which said simulated sinusoidal voltage is substantially devoid of harmonics below the seventh harmonic of the fundamental frequency of said voltage.

5. A static inverter comprising means for generating a pair of wave forms having half wave symmetry, means for shifting the phase of one wave form with respect to the other sufficiently to cause a phase displacement of $180°/N$ between the two wave forms, where N is the number of the harmonic to be eliminated, and means sequentially energized by the two out of phase wave forms to produce thereby a composite wave form devoid of the Nth harmonic.

References Cited by the Examiner

UNITED STATES PATENTS

| | | | |
|---|---|---|---|
| 2,755,440 | 7/1956 | Andresen et al. | 321—7 |
| 2,784,365 | 3/1957 | Fenemore et al. | 321—36 |
| 2,899,572 | 8/1959 | Skelton et al. | 321—6 |
| 2,964,622 | 12/1960 | Fire | 328—165 |
| 3,002,142 | 9/1961 | Jensen | 307—15 |
| 3,052,833 | 9/1962 | Coolidge et al. | 321—5 |
| 3,060,363 | 10/1962 | Jensen | 321—27 |

FOREIGN PATENTS 824,211    11/1957    Great Britain.

LLOYD McCOLLUM, *Primary Examiner.*

SAMUEL BERNSTEIN, MILTON O. HIRSHFIELD,
*Examiners.*